Figure 1:
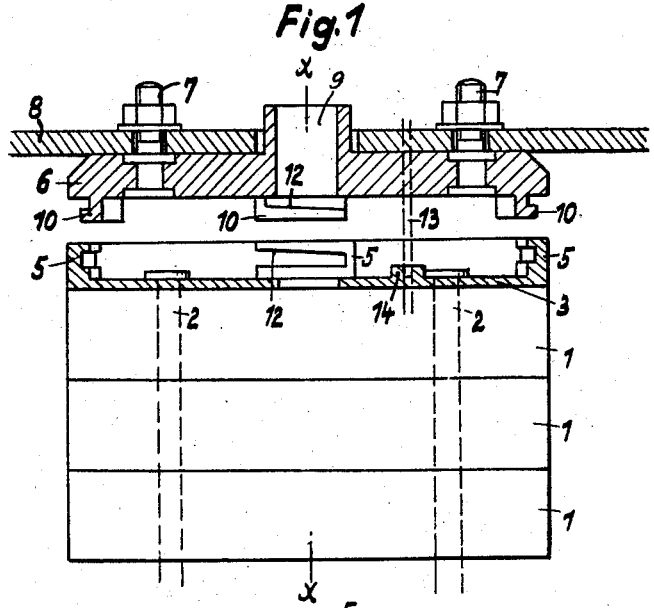

Inventor:
HUBERT NAIMER
by Karl F. Ross
AGENT

United States Patent Office 2,903,542
Patented Sept. 8, 1959

2,903,542
JOINT FOR CONNECTING UNITS OF ELECTRICAL EQUIPMENT COMPOSED OF A PLURALITY OF PREFABRICATED UNITS

Hubert Naimer, Vienna, Austria

Application August 26, 1957, Serial No. 680,255

Claims priority, application Austria August 28, 1956

5 Claims. (Cl. 200—168)

In large-scale manufacture of electrical devices in several series of different rating, which differ mainly in their dimensions, it is frequently desirable for standardization and more rational production to provide for types of different size and rating a maximum number of parts which are identical for all types of one or even several series. For similar reasons the tendency has been to increase the rating of a unit or facilitate the performance of special functions thereof by assembling the equipment from prefabricated identical units. For instance, it is usual to assemble cam-operated switches which must perform complicated switching programs from a number of identical units, the number of which varies depending on requirements; these units are aligned on a common operating shaft. In this case the units forming the switch must be connected to form an assembly. This is effected in most cases by bolts, which extend parallel to the axis of the units. To continue the consideration of this example, it is sometimes necessary to provide these switches on one side with various attachments, designed to correspond to specific conditions of installation. For instance it may sometimes be necessary to provide a complete cam-operated switch with special means for mounting it on a switchboard. For this purpose a special adapter is interposed between the switch body and the switchboard. It may also be required to combine the switch with a lock, a signal lamp or with an auxiliary switch for the control of signalling circuits. In all these cases it is desirable to have between these units a joint which is of universal utility, can be rapidly put together and can be quickly and simply separated in the case of later changes of the assembly, and which can be used with all possible variations in the assembly of the several units.

In electrical equipment which comprises movable parts, particularly parts which are arranged for a sudden movement, such as cam-operated switches or contactors, reaction forces which produce impacts may be caused in operation by spring-loaded parts returning suddenly to positions of rest, suddenly attracted armatures, or the like. These forces tend to loosen the elements of construction which hold the several parts together. This has led to the generally accepted rule of construction that the parts which serve for holding the equipment together, such as tie rods, fastening means and the like, should be designed as screws or rivets, i.e. as positive-locking elements. For a quick assembly, however, it would be desirable to use elements which can be quickly made and hold only by friction.

The invention provides such a joint for connecting units of electrical equipment composed of a plurality of prefabricated units and having moving internal parts, particularly for cam-operated switches. In accordance with my invention, at least two units are provided on their adjoining boundary faces, i.e. on those surfaces which face each other in the assembled equipment, with holding means which combine in a manner known per se to form a bayonet joint. It is surprising that this enables a permanently safe, though only frictionally held, connection of parts even in electrical equipment in which impact forces are set up. It is of special advantage to make the cooperating holding means of the bayonet joint or at least those of one half of the joint from a non-metallic thermoplastic material of moderate elasticity, e.g. of a polyamide- or superpolyamide-type plastic, because it has been found that the deformation and friction characteristics of these materials are highly desirable for the present purposes. This has also the advantage that the part which forms the bayonet joint can be produced by injection moulding in a particularly economical manner.

The use of bayonet joints in electric engineering is not new and is conventional, e.g. in cable couplings or plug connections. It is new, however, in its application to electrical equipment the component parts of which are subjected to substantial impact forces, particularly to switches, contactors, brake-lifting magnets and the like.

Figure 2:
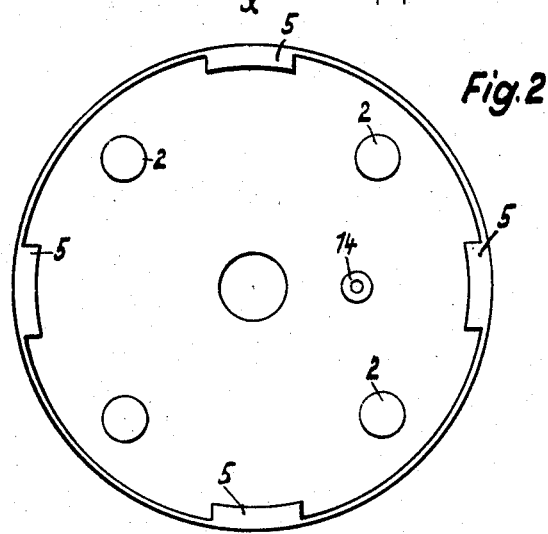

The accompanying diagrammatic drawing illustrates the invention as applied to a cam-operated switch of the type described, in connection with a base plate for fixing the switch to a switchboard. In the drawings:

Fig. 1 is a longitudinal axial sectional view through the base plate, its holding means and those of the switch; and Fig. 2 is a top plan view of the holding means of the switch, the base plate being omitted.

The switch shown in the drawing consists of a plurality of switch elements 1, aligned on a common axis x—x, in which the switch shaft (not shown) is disposed. The switch elements 1 form units of construction which are held together by bolts 2. A carrier 3 is connected by the bolts 2 to the uppermost switch element. As is shown in Fig. 2, this carrier comprises a total of four holding means 5 in the form undercut projections.

An additional unit of the switch is represented by a carrier 6, in the form of a disc, into which fixing screws 7 are pressed whereby the carrier 6 is secured to the switchboard 8, and which is formed with an opening 9 for the switch shaft. The carrier 6 is provided with holding means 10, which can coact with the holding means 5 to form a bayonet joint. Thus, the parts 5 and 6 can be fixed to each other by pushing them axially together with subsequent rotation. This fixation will be the better the more exactly the holding means to be connected mate with each other. In this connection the usual wedge effect, which is indicated by the inclination of the surfaces 12, may be utilized.

It is readily apparent that this principle, which has been illustrated with reference to a particularly simple embodiment, is capable of numerous applications and may be used to special advantage where the elements of construction are arranged on a pronounced longitudinal axis (axis x—x).

For the full utilization of the advantages of the joint according to the invention it is desirable to produce the holding means by a simple process from a material which combines favourable mechanical properties with favourable values of friction. In this sense it is appropriate to produce the holding means and the plates carrying them (3 and 6 in the example shown) by injection-moulding from a nonmetallic plastic of high strength and sufficient hardness but moderate plasticity. Such material, which is also an electrical insulator while having sufficient heat-resisting qualities and is not appreciably changed by atmospheric influences, is represented by the superpolyamide plastics.

In those cases where the units are subjected in operation to turning moments tending to loosen the bayonet joint it may be desirable as an exception to provide an additional locking means to prevent the loosening of the joint, e.g. by means of a cross pin which acts like a cotter pin and is inserted in bores provided in the elements of construction to be connected. Such locking pin is diagrammatically indicated in Fig. 1 at 13 and a projection 14 is provided in part 3 for receiving the pin 13. It is understood that this pin is only illustrative of the principle of locking. The pin can only be introduced, of course, when the parts 5, 6 to be locked are in their final position. Such pin could also be radially inserted through one of the projections 5, Fig. 2. This pin may also consist of a plastic of the type described.

In the embodiment shown by way of example the switch units 1 are held together by the usual bolts 2. In a logical application of the invention these bolts could also be replaced by joints according to the invention.

In the embodiment shown by way of example the holding projections 5 form portions of a separate part 3, which may be considered a cover of the uppermost switch unit 1. The holding projections could also be integral with the housing of the switch unit, of course. It has been found desirable, however, to provide them in a separate part, particularly where the joint is formed from plastic elements.

The holding members which combine to form the bayonet joint need not consist of one and the same material. For instance, one part could be made of metal and the other of plastic, as will be desirable in many cases.

I claim:

1. An electrical device comprising a plurality of stacked, generally disk-shaped units including a terminal unit and an adjacent unit, first coupling means on said terminal unit, second, complementary coupling means on said adjacent unit forming a bayonet connection with said first coupling means, and fastening means on said terminal unit for securing same to a stationary support.

2. A device according to claim 1 wherein at least one of said coupling means consists of a moderately resilient thermoplastic material.

3. A device according to claim 1 further comprising a locking member removably passing in radial direction through said units for preventing rotary disengagement thereof.

4. An electrical switch housing comprising a first unit in the shape of a circular disk, a second unit in the shape of a circular disk of substantially the same diameter as said first unit, first bayonet elements angularly spaced along the periphery of said first unit, second, complementary bayonet elements angularly spaced along the periphery of said second disk for mating engagement with said first bayonet elements, and axially extending fastening means on said first unit for securing same to a stationary support.

5. A switch housing according to claim 4 wherein said units are provided with aligned central apertures adapted to accommodate a control shaft.

References Cited in the file of this patent
UNITED STATES PATENTS
2,814,701   Rayer _____ Nov. 26, 1957